Aug. 1, 1950

E. ASCOLI
2,517,165
AUTOMATIC PHONOGRAPH TRIPPING MECHANISM

Filed March 14, 1947

INVENTOR
Enzo Ascoli,
BY
ATTORNEY

Aug. 1, 1950  E. ASCOLI  2,517,165
AUTOMATIC PHONOGRAPH TRIPPING MECHANISM
Filed March 14, 1947  2 Sheets-Sheet 2

INVENTOR
ENZO ASCOLI,
BY
ATTORNEY

Patented Aug. 1, 1950

2,517,165

UNITED STATES PATENT OFFICE 2,517,165

AUTOMATIC PHONOGRAPH TRIPPING MECHANISM

Enzo Ascoli, Sainte-Croix, Switzerland, assignor to Paillard S. A. (Paillard A. G., Paillard Limited)

Application March 14, 1947, Serial No. 734,809
In Switzerland April 10, 1946

3 Claims. (Cl. 274—1)

In talking machines actually available on the market and provided with a mechanism for changing discs automatically connected temporarily—for the duration of the changing of discs —to a motor by a clutch, the movement of one of the parts of the clutch producing the engagement of its two parts and thus the driving of automatic disc changing mechanism, is generally controlled by the entrance of the pick-up into the end track of the discs. This track is in fact spaced from the other track of the disc and produces a relatively large angular movement of the pick-up arm.

The latter moves by friction a lever which, during the large angular movement of the pick-up arm produced by the entrance of the latter into the end track of the disc, is so moved as to co-operate with a stop secured to the shaft of the turntable. This stop, during the passage, repels the said lever. This latter movement of the lever produces, by means of a train of transmission members, the engagement of the two parts of the clutch. As these devices controlling the engagement of the two parts of the clutch are of standard type and as the majority of talking machines actually on the market are provided with these devices, these will not be described in detail herein. It is sufficient for understanding the technical advantages which the present invention presents relatively to these known devices, to bear in mind that the train of members connecting the lever, driven by friction by the pick-up arm, to the movable part of the clutch, is provided with a catch which normally —during the audition of a disc— is in the set position, that is to say which holds the movable part of the clutch in the disengaged position against the action of a spring.

It is clear that this mechanism is relatively complicated, particularly by reason of the fact that the catch, after having been released by the action of the stop on the lever, should be re-set so that this mechanism is again ready to operate at the end of the audition of the next disc.

The object of the present invention is to reduce the number of members necessary for producing the engagement of the two parts of the clutch, and to allow of the construction of a simple, compact mechanism at a moderate cost price.

The present invention has for its subject a talking machine provided with a mechanism for automatically changing discs and for the movements of the pick-up arm connected temporarily to a motor driving in rotation the turntable, by a clutch of which the engagement of its two parts is produced by the entrance of the pick-up in the end track of the disc and by means of a lever driven by friction according to the movements of the pick-up arm, the end of this lever co-operating with a stop, driven in rotation by the shaft of the turntable so as to actuate the movable part of the said clutch by means of a train of transmission members. This machine tends to obviate disadvantages referred to by the fact that it is provided with at least one stop mounted on the shaft of the turntable and driven by the said shaft, and transmission members connecting said stop to the movable part of the clutch in such a manner that during the large angular movement of the pick-up arm produced by the end track of the disc, the lever driven by friction during the movements of the pick-up arm is placed into the path of the said stop, and produces an angular movement between this and its driving shaft, relative angular movement which in turn produces, by means for a train of transmission members, the movement of the movable part of the clutch and the engagement of its two parts.

One form of construction of a talking machine forming the subject of the invention is shown diagrammatically and by way of example in the accompanying drawings. In this drawing are shown only the members and elements necessary for the clear understanding of the device for controlling the clutch.

Figure 1:
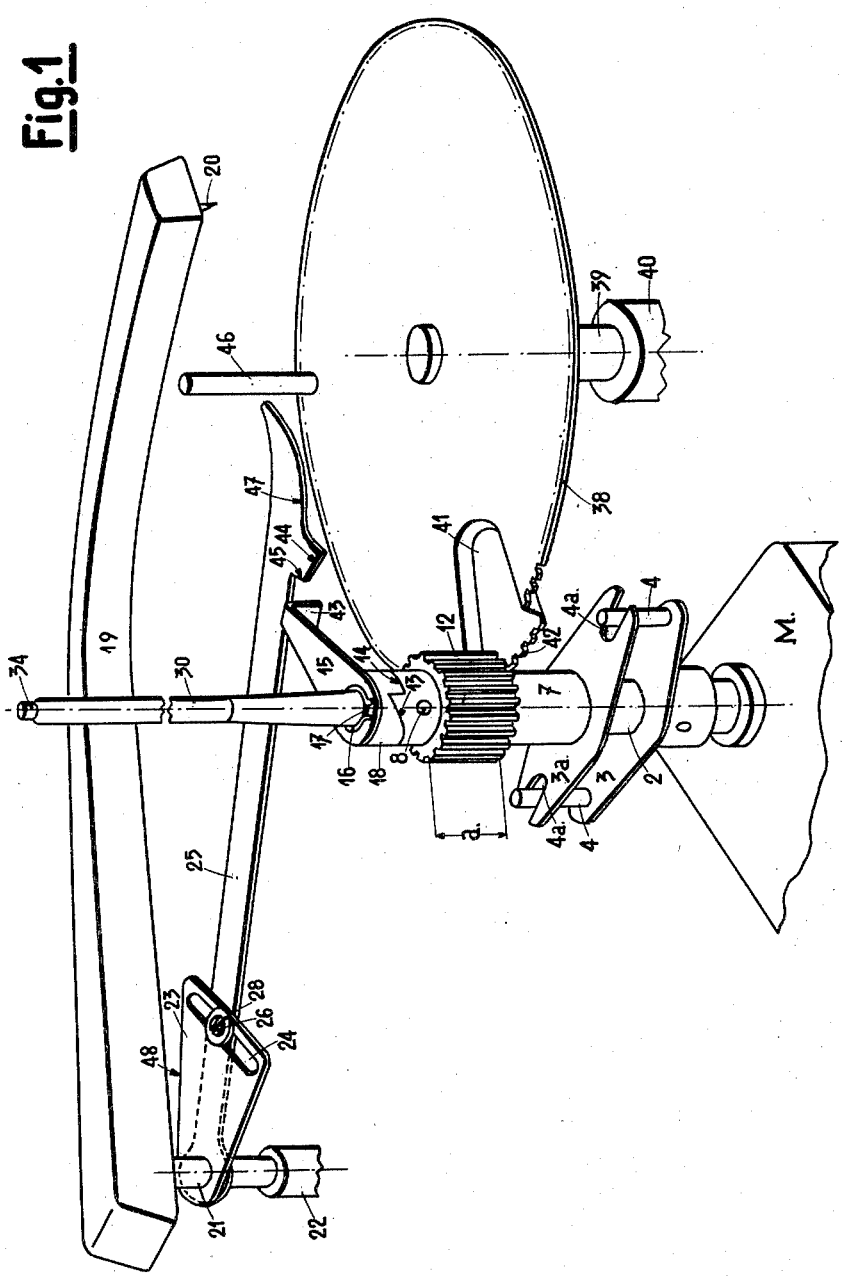
Fig. 1 is a partial view in perspective.

In the form of construction shown in the drawing, the talking machine is provided with a motor M having a driving shaft 2. A strap 3 secured to the latter carries two fingers 4 located symmetrically on opposite sides of the shaft 2. The fingers engage with openings 4a of a strap 3a secured to the end of a sleeve 7 sliding on the shaft 2.

The latter is pivoted in a bearing provided in a stationary part of the machine and has an axial bore 10 (Fig. 2) and longitudinal slots 9 formed in its walls. A pin 8 secured to the sleeve 7 passes freely through the said slots.

Figure 2:
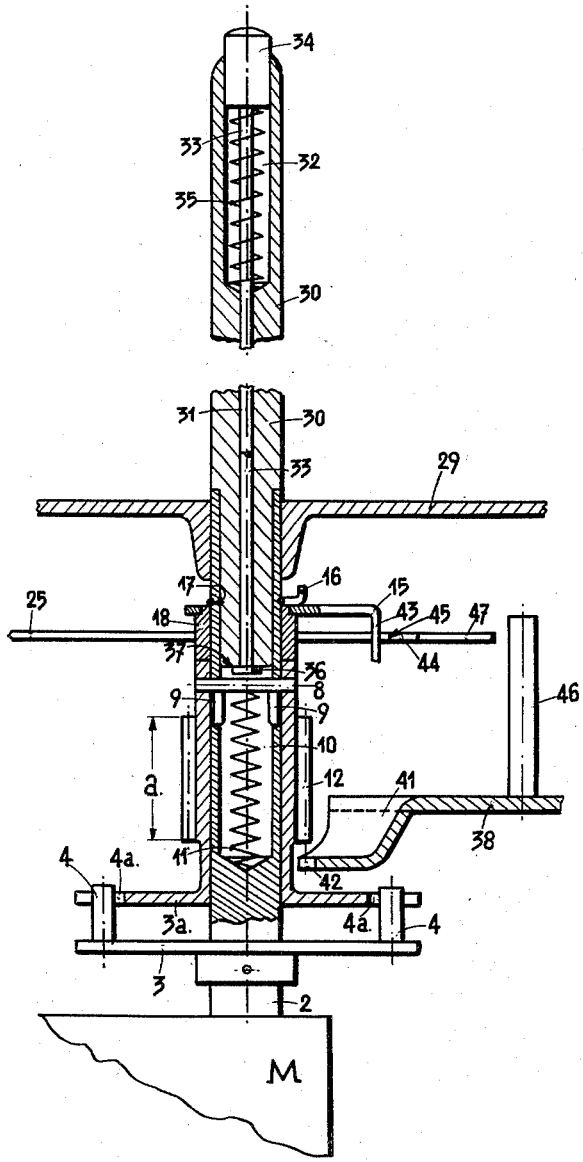
Fig. 2 is an axial sectional view of the driving shaft of the motor.

A spring 11 located in the bore 10 tends to hold the pin 8 in the position shown in Fig. 2.

On the sleeve 7 is cut a pinion 12 and the upper end of the sleeve has end teeth 13 in the form of dog teeth. These teeth gear with similar teeth 14 provided in the lower end of a barrel 18 mounted freely on the shaft 2. The barrel carries a stop 15 secured rigidly thereto. A stay, formed by an annular spring 16 engaging with a groove 17 of the shaft 2 defines the axial position of the barrel 18.

The arm 19 of the pick-up 20 is hinged, as is usual, on a vertical shaft 21 pivoted in bearings 22 provided in a stationary part of the machine. The shaft 21 has secured rigidly thereto a sector 23 having a slot 24 in the form of an arc of a circle. A lever 25, turning freely on the shaft 21, is driven by friction so as to follow the angular movements of the latter. For this purpose a screw 26, secured to the lever 25, engages with the slot 24. The lever 25 is pressed resiliently, by means of a resilient washer 28, against the sector.

The turntable 29 is secured to the shaft 2 which carries an extension 30 having an axial bore 31 and a recess 32. A rod 33 sliding in the bore 31 carries at its upper end an operating member 34 and is subjected to the action of a spring 35 tending to cause the operating member 34 to project from the recess. The axial position of the rod 33 is defined by a head 36 bearing against the end face 37 of the extension 30.

The mechanism for the automatic changing of discs and of the movement of the pick-up (not shown) is actuated by a toothed wheel 38 secured to a shaft 39 pivoted in bearings 40 provided in a stationary part of the framework. This toothed wheel has a recessed section 41 and is provided opposite the latter with a toothed sector 42 located in a plane parallel to the plane of its teeth. The teeth of the sector 42 correspond with those of the wheel. The wheels 38 and the toothed sector 42 together form the stationary part of a clutch of which the movable part is formed by the pinion 12 carried by the sleeve 7 sliding longitudinally along the shaft 2. In fact the teeth of the pinion 12, of the wheel 38 and of the sector 42 have the same pattern, and their relative positions are so selected that the axial movement of the pinion 12 is sufficient to enable this to gear with the sector 42. Further the height $a$ of the teeth of this pinion is sufficient so as to be capable of gearing simultaneously with the teeth of the sector 42 and with those of the wheel 38.

From the foregoing and examination of the drawing it will at once be seen that when the pick-up arm engages with the tracks of a disc the said arm is driven, as the audition proceeds in the direction of the shaft 2. The pick-up arm in its angular movement, drives the lever 25 by friction. The end of the lever 25 thus comes imperceptibly into contact with the end 43 of the stop 15. However the angular movement of this lever, during a complete revolution of the disc, is very small so that the bent part 43 of the stop 15 slides on a ramp 44 provided at the free end of the lever 25 and repels it through an angle equal to that of its movement.

On the contrary when the pick-up enters the end track of the disc, the pick-up arm rapidly makes a large angular movement. It drives the lever 25 in its movement which in consequence is also subjected to a large angular movement, the latter is sufficient to bring into the path of the part 43 of the stop 15 a hooking surface or abutment 45 provided on the lever 25. As a result the stop 15 is stopped in its rotation and slides on the shaft 2. There is thus produced a relative angular movement between the barrel 18 and its driving shaft 2. The pinion 12 continues its rotation, the teeth 13 slide on the teeth 14 whereby an axial movement of the sleeve 7 and of the pinion 12 is produced against the action of the spring 11. This axial movement is sufficient to engage the pinion 12 with the teeth of the sector 42 so that as the two parts of the clutch are engaged and the toothed wheel 38 is rotated.

After a relatively small angular movement of the latter the pinion 12 gears with the teeth of the wheel 38. This carries a pin 46 which during its rotation acts on a ramp 47 of the lever 25 and repels the latter by a sufficient amount to product the release of the finger 43. As the teeth in the form of dog teeth of the barrel 18 and of the sleeve 7 co-operate with one another under the action of the spring 11 they produce the return of the barrel 18 to its relative angular position shown in Fig. 1 and thus an upward axial movement of the sleeve 7. The stop 15 is again set in rotation.

As the pinion 12 is in engagement with the teeth of the wheel, this carries out a complete revolution. In fact as after a complete revolution of the wheel 38 its cutout sector is again opposite the pinion 12 the mechanical connection between the shaft 2 and the shaft 39 is interrupted automatically.

When the user desires to effect the changing of a disc prematurely, that is to say before the end of its audition, it suffices for him to apply pressure to the operating member 34, against the action of its return spring 35. The head 36 of the rod 33 acts on the pin 8 and causes it to partake of the axial movement imparted to the rod 33.

This pin moves in the slots 9 and causes the sleeve 7, to which it is secured, to partake of this movement, as also the pinion 12. This axial movement of the pinion 12 produces the engagement of its teeth with those of the sector 42 and thus the engagement of the two parts of the clutch as above described.

One form of construction of a talking machine, forming the subject of the invention, has been described herein by way of example and with reference to the accompanying drawing, but it will be understood that all the members and mechanisms described and shown may be suitably replaced by their equivalents.

The teeth 13 and 14 provided on the end faces of the sleeve 7 and of the barrel constitute in fact a transmission device for converting a relative angular movement into a relative axial movement.

The device for controlling the engagement of the parts of the clutch, with which the talking machine, forming the subject of the invention, is provided, as will be appreciated easily from the foregoing and from examination of the drawing, is much simpler than all the devices proposed up to the present time for effecting the control of the engagement of the two parts of the clutch actuating the disc changing mechanism. Further by reason of this great simplicity, its operation is absolutely certain and precise. Finally the device has no mechanism requiring great precision of adjustment of its elements or machining thereof, so that the cost price of the talking machine, forming the subject of the invention, is less than that of a known talking machine, and its life is longer because wear of its members has practically no influence on its satisfactory operation.

I claim:

1. In an automatic phonograph, the combination, comprising, a turntable, a pick-up arm for engaging the sound track and the return track of a record disc on the turntable, a post depending from one end of the said arm and fixed thereto, a lever loosely mounted on said post, means for frictionally engaging the lever to the post for movement with the post and tone arm, a laterally offset abutment on the free end of the lever, a motor driven shaft supporting the turntable; a clutch between the turntable and motor, said clutch consisting of a sleeve having ratchet teeth on its upper end and a flange on its lower end provided with openings and slidable axially on the motor shaft, a pinion on the outer medial portion of the sleeve, a cross member fixed to the driven shaft and having keys entering said openings in said flange, spring means for urging the sleeve upwardly, a barrel member having ratchet teeth on its underside meshing with the ratchet teeth on the upper end of the sleeve, a stop arm extending radially of the barrel and having its free end positioned for engagement with the abutment on the lever, said barrel member being rotatable on the motor driven shaft and immovable axially thereof, and when engaged with the sleeve rotating with the motor driven shaft, and when engaged by the lever held against rotation relative to the shaft thereby causing the ratchet teeth of the barrel to slip on the teeth on the sleeve to displace the sleeve and the pinion fixed thereto axially of the shaft, and a toothed wheel supported at one side of the pinion and including a depressed toothed section, said toothed section meshing with said pinion owing to its axial displacement and rotating the toothed wheel for one complete revolution, until the depressed toothed section is again opposite the pinion, and means on the toothed wheel for disengaging the lever from the stop arm.

2. In an automatic phonograph according to claim 1, wherein the means on the toothed wheel for engaging the lever is an upstanding pin which engages the lever to move the lever and withdraw the abutment thereon from the free end of the stop arm so that at the end of the cycle of rotation of the toothed wheel the depressed toothed section will again be opposite to and disengaged from the pinion.

3. In an automatic phonograph, the combination, comprising, a turntable, a pick-up arm for engaging the sound track and return track of the record disc on the turntable, a post depending of said arm and fixed thereto, a lever loosely mounted on said post, means for frictionally connecting the lever to the pick-up arm for movement therewith, a laterally offset abutment on the free end of the lever, a motor driven shaft supporting the turntable, said shaft comprising a lower hollow portion and an upper spindle portion having a bore, said spindle portion fitting into said hollow portion, said hollow portion having lateral slots, a sleeve axially slidable on the hollow portion of the motor driven shaft and having ratchet teeth at its upper end and a flange provided with openings at its lower end, a pinion on the medial portion of the sleeve, a transverse key carried by the sleeve and disposed in said slots of the lower portion of the motor driven shaft, a cross member carried by the motor driven shaft and having keys engaging the openings in the flange, a barrel element having ratchet teeth on its lower face for engaging with the ratchet teeth on the upper edge of the sleeve, a stop arm projecting radially from the barrel and having its free end adapted for engagement with the abutment on the lever, said barrel being loosely mounted on the hollow portion of the motor driven spindle, means for holding said barrel in a fixed position longitudinally of the motor driven shaft, a toothed wheel supported at one side of the pinion and including a depressed part comprising a toothed sector, the pinion during rotation of the motor driven shaft, barrel member and stop arm being opposite the depressed part of the toothed wheel exclusive of the teeth of the sector, but meshing with the teeth of said sector only during axial displacement of the movable sleeve due to the stop arm engaging the abutment on the lever in order to rotate the toothed wheel, a manually manipulated member spring urged in the bore of the upper portion of the motor driven spindle, a finger-engaging button on the upper end of said member, and a head on the lower end of said member adjacent the transverse key carried by the sleeve, whereby manipulation of the said manual member inwardly will actuate the sleeve unit independently of the barrel and stop arm.

ENZO ASCOLI.

REFERENCES CITED

The following references are of record in the file of this patent:

UNITED STATES PATENTS

| Number | Name | Date |
|---|---|---|
| 257,839 | Barnes | May 16, 1882 |
| 1,707,572 | Roller | Apr. 2, 1929 |
| 2,235,693 | Wells | Mar. 18, 1941 |
| 2,371,362 | Small | Mar. 13, 1945 |